United States Patent [19]

Kano et al.

[11] Patent Number: 4,862,989
[45] Date of Patent: Sep. 5, 1989

[54] TWO AND FOUR-WHEEL DRIVE TRANSFER DEVICE

[75] Inventors: Junichi Kano, Kariya; Kongoh Aoki, Toyota, both of Japan

[73] Assignee: Aisin Seiki Kabushiki Kaisha, Kariya, Japan

[21] Appl. No.: 249,950

[22] Filed: Sep. 27, 1988

[30] Foreign Application Priority Data

Sep. 29, 1987 [JP] Japan .................................. 62-245599

[51] Int. Cl.$^4$ ............................................. B60K 17/34
[52] U.S. Cl. ........................................ 180/247; 74/34; 74/339; 192/82 P; 464/160
[58] Field of Search .................. 180/247, 233; 74/339, 74/34, 405, 411; 192/20, 82 P; 464/57, 160

[56] References Cited

U.S. PATENT DOCUMENTS 4,290,318  9/1981  Ookuba et al. .................. 180/247
4,805,472  2/1989  Aoki et al. ...................... 180/247

Primary Examiner—Charles A. Marmor
Assistant Examiner—Donn McGiehan
Attorney, Agent, or Firm—Burns, Doane, Swecker & Mathis

[57] ABSTRACT

A two-wheel and four-wheel drive transfer device includes a reciprocating fork shaft having a shift fork engagable with a sliding dog clutch so as to reciprocate the dog clutch and provide either two-wheel and four-wheel drive operating conditions. A motor is provided so as to rotate a worm gear assembly which is relatively rotatable with an output shaft supported in a casing. This worm gear is connected to and rotates a plate concurrently with rotation of the worm gear. A spring support plate is provided to be secured to the output shaft and two spiral springs, each spring being wound in a different direction and having a different rotating torque, are fixed to the output shaft and have ends brought into contact with the rotating plate and the spring support plate so that the rotating torque of the worm wheel is transmitted to the output shaft through the spiral springs depending on the direction of rotation of the worm gear.

4 Claims, 2 Drawing Sheets

TWO AND FOUR-WHEEL DRIVE TRANSFER DEVICE

BACKGROUND OF THE INVENTION

1. Field of the Invention

The present invention relates to two-wheel drive and four-wheel drive transfer devices for shifting between two and four-wheel drive in vehicle equipped for such operation and to control devices for four-wheel steering mechanisms and related devices.

2. Description of the Prior Art

Two and four-wheel drive transfer devices for four-wheel drive vehicles are disclosed, for example, in Japanese patent Application No. 61-229542. FIG. 2 shows such a prior device and includes a shaft 1 which receives a drive torque from an engine through a transmission and rotates as a front or rear wheel drive shaft. An output shaft 3, which acts as a front wheel drive shaft, is supported in the shaft 1 by means of a bearing arrangement 2. The shaft 1 has a spline set 4. The output shaft 3 is provided with a spline set indicated at reference numeral 7. A sliding dog clutch 5 is movable by a shift fork 6 between a first or illustrated position in which the sliding dog clutch 5 is only in engagement with the spline set 4 and a second position for connecting spline sets 4 and 7 for concurrent rotation. In the first position of operation, the transfer mechanism provides for two-wheel drive operation. A second position of the sliding dog clutch 5 provides for engagement between the spline set 4 of the shaft 1 and the spline set 7 of the shaft 3. When the sliding dog clutch 5 is in such position as to interconnect the spline sets 4 and 7, four-wheel drive operation would then be available for the vehicle.

A worm gear 10 is secured or otherwise attached to a motor shaft 9 and rotates therewith at the speed as driven by the motor, for example, a high speed electric motor drive. A worm wheel or gear 11 is in engagement with the worm gear 10 and is supported on and relatively rotatable with an output shaft 12 through a sleeve arrangement 13. Two rotating plates 15a and 15b are provided on the output shaft 12 so as to co-rotate with the worm wheel 11. The plates 15a and 15b are integrated or interconnected by means of a connecting sleeve 14. The output shaft 12 is also provided with two plates 16a and 16b which are secured thereto so as to permit the transmission of the rotary driving force from the worm gear 11, through plates 15a and 15b to the plates 16a and 16b. Positioned between the rotating plates 15a and 15b are two split spring guides 17a and 17b. A tension spring 18 is inserted between the spring guides. The tension spring 18 is provided with end portions 19a and 19b. The end portion 19a of the spring 18 is in contact or otherwise connected with the plates 15b and 16b. The end portion 19b of the spring 18 is in contact or otherwise connected with the plates 15a and 16a.

A conductive, e.g., copper, contact plate 22 is provided on the worm wheel 11 so a to rotate therewith. An opposing contact is provided on the casing 21. The plate and contact cooperate so as to provide an indication of the rotational position of the worm wheel. A projection 24 is provided so as to surround and protect a cam switch 23 actuatable by movement or rotation of the worm wheel. Gear 25, of relatively small diameter, is secured to the output shaft 12 and is in meshing engagement with gear 26, of larger diameter, secured or fixed to countershaft 27. The countershaft 27, in a manner similar to shaft 12, is rotatably secured in the casing 21. The counter shaft 27 is also provided with a pinion gear 28 which is connected to an output shaft 29. The connection between the gear 28 and output shaft 29 is through a rack and pinion arrangement (not shown). The output shaft 29 is arranged, with respect to the drive gear 28, to provide a reciprocating motion. The output shaft 29 is secured to the fork shaft 30 on which the shift fork 6 is secured or fixed.

When the drive motor (not shown) is in operation and the sliding dog clutch 5 is in engagement with the spline set 4, the worm gear 10 is rotated by the motor shaft 9 and the worm wheel 11 is rotatably driven thereby. The rotational movement of the worm wheel is transmitted to the rotating plate 15a so as to twist the end 19b of the torsion spring 18 so that the rotational torque of the worm wheel 11 is stored in the torsion spring 18. Due to the connection of the spring 18 to the plates 16a and 16b, the rotational torque is then transmitted through the plates 16a and 16b to the output shaft 12 so as to cause the output shaft 12 to rotate. Rotational movement of the shaft 12 rotates pinion gear 25 secured thereto and gear 26 which is in meshing engagement with gear 25 and which is secured to countershaft 27. The rotational movement of the countershaft 27 provides a reciprocating motion to the shaft 29 due to the driving engagement of pinion 28 with the shaft 29. Shaft 29 is then moved in a reciprocating direction. Upon movement of the shaft 29, the shaft 30, secured thereto, will follow so as to move the sliding dog clutch 5 to a position which engages the spline set 7 provided on shaft 3 while continuing to be engaged with spline set 4. The output shaft 3 is then connected to the shaft 1 so that four-wheel drive is obtained.

In the description of the above-discussed prior device, the engagement operation between splines 4 and 7 and the disengagement operation between the spline sets 4 and 7 is based upon the output of the torsion spring 18. Accordingly, it may be difficult to properly complete the operations of engagement and disengagement as the output requirement for movement of the shift fork differs for selecting between two-wheel and four-wheel driving conditions and will generate different ranges of noise and shock with each of the engagement and disengagement operations.

SUMMARY OF THE INVENTION

Therefore, it is an object of the present invention to provide and improve two-wheel and four-wheel drive transfer devices which obviate the drawbacks discussed above.

It is another object of the present invention to provide an improved two-wheel and four-wheel drive transfer device which minimizes shock and noise during the transfer into the two-wheel and four-wheel drive operation conditions.

It is still another object of the present invention to provide an improved two-wheel and four-wheel drive transfer device wherein a satisfactory output for proper engagement for transfer operations is obtained.

According to the present invention, the two-wheel and four-wheel drive transfer device comprises a reciprocating fork shaft having a shift fork operable to reciprocate a sliding dog clutch so as to thereby complete the transfer between two-wheel and four-wheel drive operation. A worm wheel is provided so as to be rotated by a motor and be relatively rotatable with respect to an output shaft. A rotatable plate is provided which is rotated with the worm wheel and a spring support plate is secured to an output shaft of the device. Two spiral spring arrangements, being wound in different directions and providing different rotating torques, have one end fixed to an output shaft with the other end being brought into contact with the rotating plate and the spring support plate so that the rotating torque of the worm wheel is transmitted to the output shaft through the spiral spring, in either rotational direction of the worm wheel.

BRIEF DESCRIPTION OF THE DRAWINGS

The foregoing and other objects, features and advantages of the invention will be apparent from the following more particular description of a preferred embodiment of the invention as illustrated in the accompanying drawings, wherein.

DESCRIPTION OF THE PREFERRED EMBODIMENT

Figure 1:
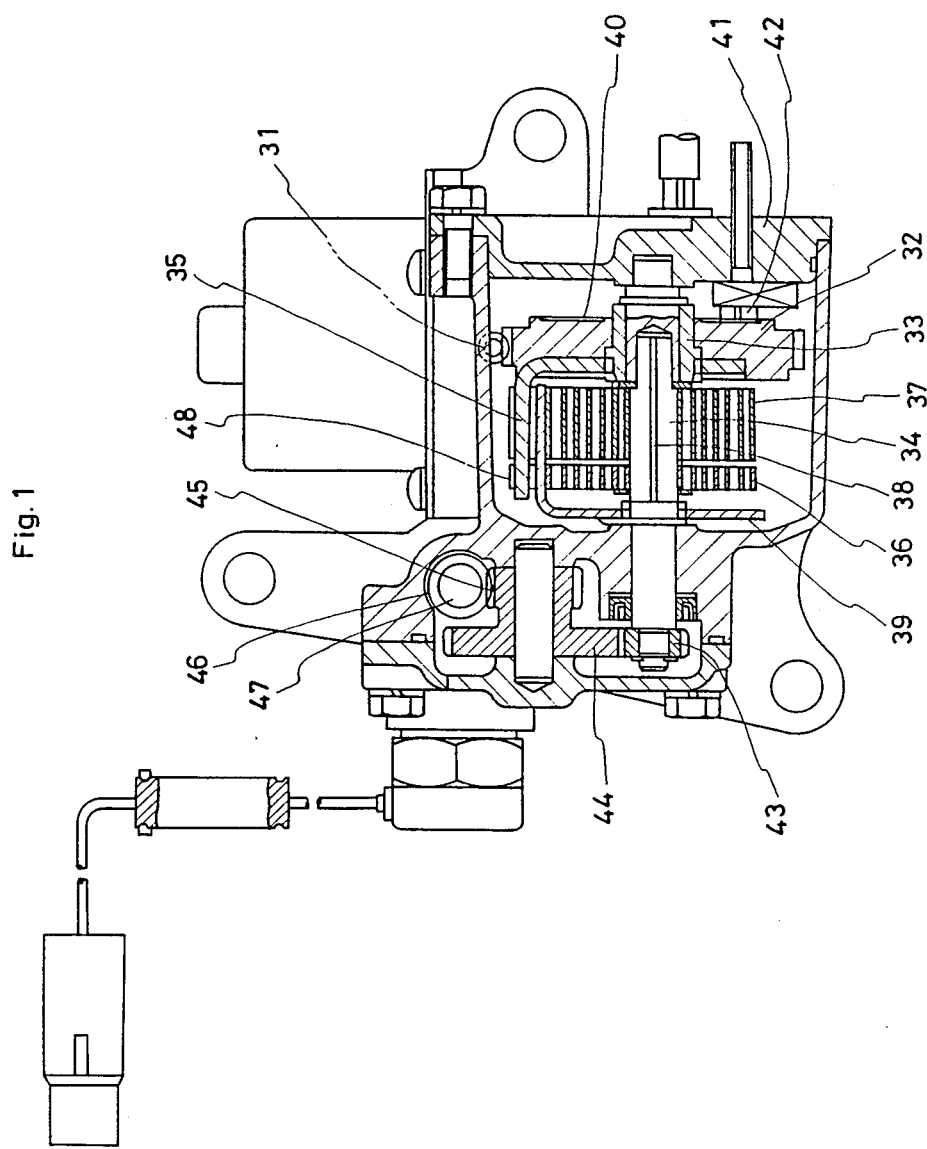
FIG. 1 is a cross-sectional view of a two-wheel and four-wheel drive transfer device according to the present invention; and, FIG. 2 is a cross-sectional view of a prior art two-wheel and four-wheel drive transfer device.

With reference to FIG. 1, a two-wheel and four-wheel drive transfer device according to the present invention is shown. Therein, a worm wheel or gear 32 is arranged to be rotated by engagement with a gear 31 driven by a motor. A rotatable plate 35 is arranged coaxially with an output shaft 34 and is relatively rotatable therewith. The rotating plate 35 is secured to the worm gear 32 for simultaneous rotation therewith. The output shaft 34 is provided with a groove 38 along a central portion of the shaft to which one end of spiral springs 36 and 37 are secured. A spring plate 39 fixed to the output shaft 34 is provided for supporting the springs 36 and 37. The spiral springs 36 and 37 are wound in different directions and have different rotating torques, i.e., different spring constants. As is apparent from the foregoing description, one end of the spring 36 is attached to the groove 38 and the other end of the spring 36 is attached to the plate 35. A first end of spring 37 is attached to the groove 38 and the second end of the spring 37 is attached to the plate 39. Accordingly, when the worm gear or wheel 32 rotates in one direction, one end of the spiral spring 36 is brought into contact with the rotating plate 35 so that the spring 36 and the plate 35 rotate concurrently. When the worm wheel 32 rotates in the opposite direction, one end of the spiral spring 37 and rotating plate 35 are brought into contact so that the spring 37 and the plate 35 rotate concurrently.

Figure 2:
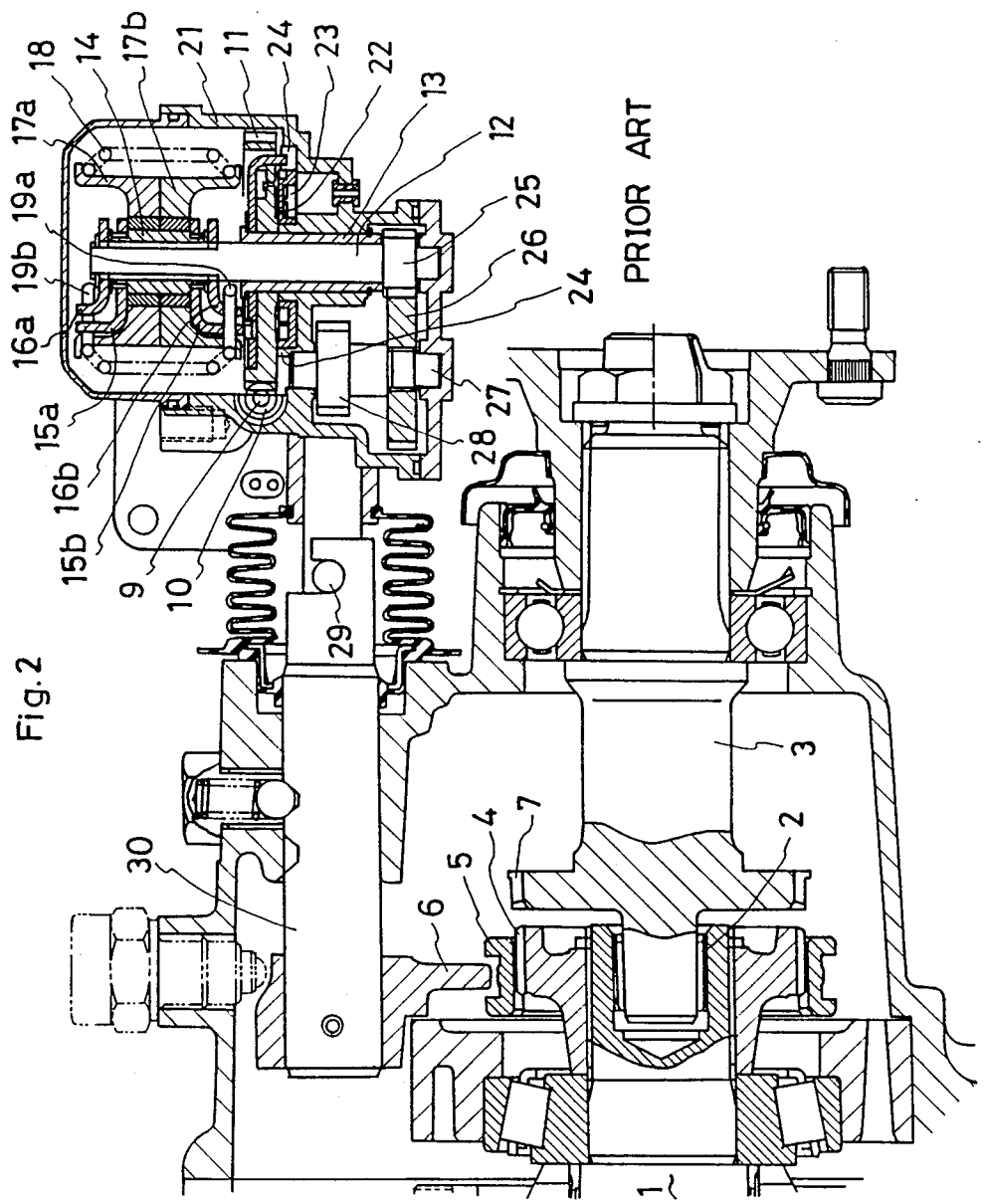

A circular, copper plate 40 is attached to the worm wheel 32 and serves as a first contact for determining the rotational position of the worm gear 32. An additional contact 42, mounted on the casing 41, in cooperation with contact 40, senses the rotational position of the gear 42. The output shaft 34 is also provided with a gear or pinion 43 at an end opposite the worm gear 32. The gear 43 is in engagement with a gear 44 secured to a stub shaft. The gear 44 is integral with a gear 45 of smaller diameter which is also mounted on the stub shaft to form a compound gear set. Rotary movement of shaft 38 and gear 43 is transmitted to gear 44. As gear 45 is integral with gear 44, gear 45 drives a gearing arrangement 46. The gearing arrangement 46 is provided or otherwise secured in any known manner on a shift fork 47. The shift fork 47 will complete the transfer operation in a manner similar to that of the device discussed in the description of FIG. 2.

In operation of the device, if a situation arises in which the teeth of the spline portions are not completely engaged, smooth engagement and smooth transfer between two-wheel and four-wheel driving operations may not occur. If so, it may be necessary to utilize the manipulating force for controlling the shifting of the sliding dog clutch until the teeth of the spline sets are in alignment. When the worm wheel 32 is rotated to the right, as viewed from above in FIG. 1, the rotating plate 35 will cause the end 48 of the spiral spring 36 to rotate due to the connection between the spring and the plate. The driving force provided by the motor 31 will stop upon operation of the circular plate contact 40 coming into contact with the contact 42. Under these conditions, when the teeth of both splines are not in alignment for providing proper meshing engagement, the output shaft 34 and the spring plate 39 will not be rotated. As one of the end portions of the spiral spring 36 is attached to the groove 38 of the output shaft 34, and the other end 48 of the spring 36 is rotated by rotational movement of the plate 35, the spiral spring 36 will be wound. Accordingly, the torque which would correspond to the rotation movement of the worm wheel 32 is stored in the spring 36.

Subsequently, when the spline sets are correctly aligned and the sliding dog clutch is able to move so as to connect the spline sets, the plate 39 and the output shaft 34 are rotated by the torque stored in the spring 36 so as to rotate through the gearing arrangement 43, 44 and 45 and move the shift fork 47. Under these conditions, the spiral spring 37 is then rotated with plate 39 and the output shaft 34. When the worm wheel 32 rotates in an opposite direction, the spiral spring 37 is wound up and thereafter the shift fork is displaced in substantially the same manner as discussed above.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A two-wheel and four-wheel drive torque transfer device comprising a reciprocating fork shaft having a shift fork connecting to a sliding dog clutch to reciprocate the sliding dog clutch to thereby complete a transfer between two-wheel and four-wheel drive, a drive motor and a worm wheel rotatable by the motor and relatively rotatable with respect to an output shaft supported in a casing said output shaft connected, through a gear set to reciprocate said reciprocating fork shaft including;

a contact plate rotatable with the worm wheel, a spring support plate secured to the output shaft, a spiral spring set having two spiral springs being wound in different directions and provided with different rotating torques fixed to the output shaft and having ends in contact with said contact plate and said spring support plate, whereby the rotating torque of said worm wheel is transmitted to said output shaft through one o said two spiral springs.

2. A two-wheel and four-wheel drive torque transfer device as set forth in claim 1, wherein one end of each of said two spiral springs is secured in a groove provided in said output shaft.

3. A two-wheel and four-wheel drive torque transfer device as set forth in claim 1, wherein a contact switch is engageable with said contact plate to control operation of said drive motor and rotational position of said worm wheel.

4. A two-wheel and four-wheel drive torque transfer device as set forth in claim 1, wherein said output shaft has a driving pinion fixed thereto and in meshing engagement with a first driven gear of a compound gear set, a second driven gear of said compound gear set in meshing engagement with a gear transfer means for transferring rotary motion of said gear means into reciprocating motion for reciprocating said sliding dog clutch.

* * * * *